United States Patent

Mark et al.

[11] Patent Number: 5,883,716
[45] Date of Patent: Mar. 16, 1999

[54] RATE CONTROL LOOP FOR FIBER OPTIC GYROSCOPE

[75] Inventors: John G. Mark, Pasadena; Daniel A. Tazartes, West Hills, both of Calif.

[73] Assignee: Litton Systems, Inc., Woodland Hills, Calif.

[21] Appl. No.: 893,961

[22] Filed: Jul. 15, 1997

[51] Int. Cl.⁶ .................................................. G01C 19/72
[52] U.S. Cl. ............................................................ 356/350
[58] Field of Search ................................................ 356/350

[56] References Cited

U.S. PATENT DOCUMENTS

| | | |
|---|---|---|
| 4,705,399 | 11/1987 | Graindorge et al. . |
| 4,998,822 | 3/1991 | Steele ...................................... 356/350 |
| 5,116,127 | 5/1992 | Gröllmann . |
| 5,133,600 | 7/1992 | Schröder . |
| 5,137,359 | 8/1992 | Steele . |
| 5,189,488 | 2/1993 | Mark et al. . |
| 5,214,488 | 5/1993 | Büschelberger et al. . |
| 5,268,740 | 12/1993 | Gröllmann . |
| 5,337,143 | 8/1994 | Mark et al. . |
| 5,473,730 | 12/1995 | Kemmler . |
| 5,485,274 | 1/1996 | Kemmler . |
| 5,530,545 | 6/1996 | Pavlath . |
| 5,682,241 | 10/1997 | Mark et al. .............................. 356/350 |
| 5,684,589 | 11/1997 | Mark et al. .............................. 356/350 |

*Primary Examiner*—Samuel A. Turner
*Attorney, Agent, or Firm*—Elliott N. Kramsky

[57] ABSTRACT

A closed-loop system for regulating a fiber optic gyroscope is configured so that the residual error of a so-called deadbeat system assumes a higher order function of frequency. The closed-loop gyro includes a rate controller within the feedback path. The rate controller receives the gyro output from the last loop transit corrected for d.c. offset and for nominal dither and outputs a gyro rate estimate. The rate controller includes a plurality of feedback integrators in cascaded relationship. In this way, the residual gyro error associated with inherent loop delay is elevated to a higher-order relationship to sensed gyro rate. As a result, a substantial reduction in residual error as a function of sensed gyro rate occurs throughout the range of operational gyro frequencies.

12 Claims, 6 Drawing Sheets

RATE CONTROL LOOP FOR FIBER OPTIC GYROSCOPE

BACKGROUND

1. Field of the Invention

The present invention relates to apparatus for controlling the operation of the control loop of a fiber optic gyroscope. More particularly, this invention pertains to apparatus for compensating errors that result from inherent feedback signal time lag.

2. Description of the Prior Art

The Sagnac interferometer is an instrument for determining rotation by measurement of the non-reciprocal phase difference generated between a pair of counterpropagating light beams. This instrument generally comprises a light source such as a laser, an optical waveguide consisting of several mirrors or a plurality of turns of optical fiber, a beamsplitter/combiner, a detector and a signal processor.

In an interferometer, the waves coming out of the beamsplitter counterpropagate along a single optical path. The optical waveguide is "reciprocal"; that is, any distortion of the optical path affects the counterpropagating beams similarly although they do not necessarily experience such perturbation at the same time or in the same direction. Time-varying perturbations may be observed where the time interval is comparable to the propagation time of the light around the optical waveguide whereas "non-reciprocal" perturbations affect the counterpropagating beams differently and according to the direction of propagation. Such non-reciprocal perturbations are occasioned by physical effects that disrupt the symmetry of the optical medium in which the two waves propagate. Two of the non-reciprocal effects are quite well known. The Faraday, or collinear magneto-optic effect, occurs when a magnetic field creates a preferential spin orientation of the electrons in an optical material whereas the Sagnac, or inertial relativistic effect, occurs when rotation of the interferometer with respect to an inertial frame breaks the symmetry of propagation time. The latter effect is employed as the principle of operation of a ring gyroscope.

It is known that the fringe or interference pattern formed by the counterpropagating beams of a gyro consists of two elements, a d.c. component and a component that is related (e.g. cosine function) to the cause of the phase difference between the beams. This phase difference provides a measure of the non-reciprocal perturbation due, for example, to rotation. As a consequence of the shape of the fringe pattern, when small phase differences are to be measured (e.g. low rotation rates), the intensity of the combined beam is relatively insensitive to phase difference as such difference occurs close to the maximum of the phase fringe pattern. Further, mere intensity of the composite beam does not indicate the sense or direction of rotation.

For the foregoing reasons, an artificially biased phase difference is commonly superimposed upon the counterpropagating beams. The biasing of the phase shift, also known as "non-reciprocal null-shift," enhances the sensitivity of the intensity measurement to phase differences. A maximum degree of sensitivity is achieved by shifting the operating point of the gyroscope to $\pm\pi/2$ (or odd multiples thereof). Furthermore, by alternating the bias between $+\pi/2$ and $-\pi/2$, two different operating points are observed. This enables the system to determine the sign of the phase difference and, thus, the direction of rotation.

In addition to phase modulation, the processing of an interferometer output commonly employs "phase nulling" that introduces an additional phase shift through a negative feedback mechanism to compensate for that due to the non-reciprocal (Sagnac) effect. Commonly, the negative feedback generates a phase ramp whose slope is proportional to the rate of rotation to be measured. In actual practice, a ramp whose height varies between 0 and $2\pi$ radians is employed as the nulling phase shift cannot be increased indefinitely due to voltage constraints.

U.S. Pat. No. 4,705,399 of Graindorge et al. discloses a digitally-based arrangement, that employs a "stairstep" waveform. The height of each step is equal to the measured phase difference while the width or period of each is the group delay time of the optical coil. On the average, the slope of the ramp is equivalent to the measured non-reciprocal phase difference per unit of time. This method is compatible with digital signal processing and enjoys many resulting advantages. The phase modulation may be directly added to the digital ramp through the synchronization offered by a digital signal processor. The (combined) signal ultimately controls the phase modulator that is positioned within the optical fiber coil.

The operation of a fiber optic gyroscope accordingly requires the performance of numerous functions, including the above-described modulations (and associated demodulations) on a continuing basis. That is, such actions must be performed generally at least as frequently as each loop transit time $\tau$. In the event that additional functions are desired (for example, to increase gyro accuracy), such other functions may also require repetition of actions during each loop transit time.

U.S. Pat. No. 5,337,143 of John G. Mark and Daniel A. Tazartes entitled "Loop Controller For Multiplexed Triaxial Gyro" discloses an application specific integrated circuit ("ASIC") that functions as a loop controller for a triaxial gyro. The controller accepts the digitized outputs of three modulated gyros, measures the rotation associated with each, digitally processes the outputs and provides analog signals for driving the gyro phase modulators. The operations of the loop controller are directed by a microprocessor. As such, a certain degree of flexibility is attained in that various types of modulation (e.g. random, pseudo-random, orthogonal, deterministic) may be input from the microprocessor and the computational power of the microprocessor is available to update system parameters. The loop controller is not programmable in and of itself. As a result, it is limited by both the speed of the associated microprocessor and its own inflexibility. Accordingly, the loop controller is constrained in scope of operation, being essentially limited to the "basic" loop controller functions of gyro modulation, demodulation of rate information, generation of a phase-nulling ramp, outputting of the rate data employed for phase-nulling, resetting of the ramp. It is, of course absolutely essential that the gyro be capable of measuring angular rate and phase modulator scale factor control (to ensure linearity and accurate modulo $2\pi$ operation). Other features, such as loop gain control (for wide bandwidth response) and offset control (to minimize noise), while not essential are extremely desirable capabilities as well.

Pending U.S. patent application Ser. No. 08/520,217 of John G. Mark and Daniel A. Tazartes entitled "Loop Controller For Fiber optic Gyroscope With Distributed Data Processing" discloses a loop controller that employs an architecture that includes distinct units for distributing the necessary data processing functions whereby operations may take place in parallel to enable additional useful functions within each loop transit time. A field programmable gate array generates variables of varying sign while an auxiliary processor updates parameters that do not require updating every loop transit time. The combination of such operations enables elimination of any need for the gyro processor to perform throughput-intensive test and branch operations.

While the prior art discloses a number of loop controller operations, a common problem in the case of closed-loop configurations results from the fact that the feedback signal indicative of the angular rate sensed by the gyro is generated and applied to the phase modulator to maintain a stable operating point. Ideally, the feedback phase should cancel the Sagnac phase to maintain the above-described null condition. Due to the inherent delays present in fiber optic gyro loops (typically two or three times the loop transit time), the feedback signal always lags the Sagnac phase. In the presence of a variable angular rate subject to acceleration and deceleration the feedback phase is continually trying to "catch up" to the actual Sagnac phase leaving a residual instantaneous signal. Such residual signal can become large in the presence of high frequency vibration, saturating the null detection amplifier and the analog-digital converter.

SUMMARY OF THE INVENTION

The present invention addresses the foregoing and other shortcomings of the prior art by providing in a first aspect, an improvement in a closed-loop system of the type that includes a fiber optic gyroscope, a phase modulator, a photodetector and a loop controller having a phase integrator and a feedback integrator, such system being subject to a residual error. The feedback integrator of the system of the invention comprises a plurality of integrators. Such plurality of integrators is interconnected so that the residual error is a higher order function of frequency.

In a second aspect, the invention provides a method for transforming a closed-loop system subject to residual error. The systems is of the type that includes a fiber optic gyroscope, a phase modulator, a photodetector and a loop controller having a phase integrator and a feedback integrator. Such method comprises the step of configuring the feedback integrator so that the residual error is a higher order function of frequency.

The preceding and other features and advantages of this invention will become apparent from the detailed description that follows. Such written description is accompanied by a set of drawing figures. Numerals of the drawing figures, corresponding to those of the written description, point to the features of the invention, like numerals referring to like features throughout.

DETAILED DESCRIPTION OF THE PREFERRED EMBODIMENT

Figure 1:
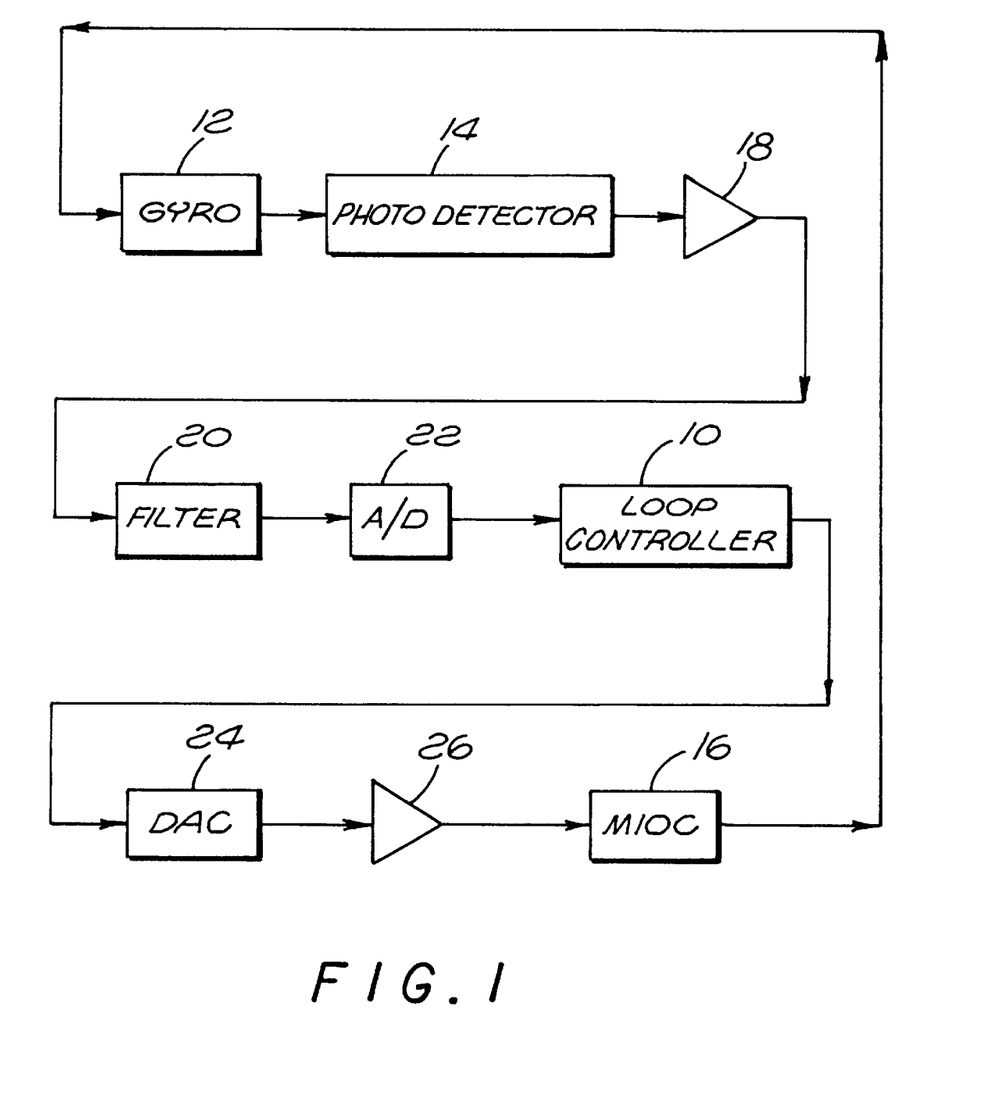
FIG. 1 is a block diagram of a closed-loop fiber optic gyro for employing the present invention.

FIG. 1 is a block diagram of a closed-loop fiber optic gyro for employing the present invention. The specific arrangement of the loop controller 10 is generally based upon that disclosed in pending U.S. patent application Ser. No. 08/520,271. While the present invention will be described with reference to a fiber optic gyro employing a loop controller generally in accordance with such teaching, it will be appreciated that this invention is applicable to closed-loop gyros and loop controllers, some of which have been described in the background portion of this application, that receive and process a measured rate as a feedback signal for deriving the signal for driving the loop phase modulator during the subsequent loop transit time.

A coherent light source (not shown) applies an output beam to a gyro 12 that includes a coil of optical fiber and an associated coupler (not shown) for dividing the output beam into a pair of beams that counter-propagate within the coil. The interferometric output beam from the gyro 12 is received by a photodetector 14 that converts the optical energy into a corresponding electrical signal. Optical phase modulation, discussed above, is applied to the beams counterpropagating within the fiber coil of the gyro 12 by means of an electro-optic phase modulator such as that present in a multifunction integrated optical chip (MIOC) 16. The phase modulation is generally formed by a specially doped $LiNbO_3$ waveguide subjected to an electric field.

The analog electrical signal output from the detector 14 is applied to a preamplifier 18 whose output is, in turn, applied to a filter 20. The output of the filter 20 drives an analog-to-digital converter 22 which digitizes the filtered analog signal to generate a waveform of digital data bits for application to the loop controller 10.

The loop controller 10 is arranged to accept the digital waveform output by the converter 22 and to generate, in response, both a measurement of rotation about the sensitive axis of the gyro 12 and a digital control signal (applied to the MIOC 16) for use in modulating and phase nulling the gyro 12 during the subsequent loop transit time $\tau$. The digital output of the loop controller 10 is applied to a digital-to-analog converter 24 whose corresponding analog output is then applied to a driver 26, the output of which drives the MIOC 16.

As discussion of the loop controller 10 proceeds, occasional reference will be made to acronyms that identify certain signals and parameters. Such parameters may be supplied to a gyro processor (discussed below) by a number of means including software, hard-wired logic and/or a combination of both. An auxiliary processor (not disclosed) may operate in conjunction with hard-wired logic in the generation of such inputs. The acronyms may represent, for example, thirty-two bit digital words.

The auxiliary processor may comprise a known microprocessor such as a TMS 320C26 that is commercially available from Texas Instruments Corp. of Dallas, Tex. It is employed to provide data (including gyro parameters) that require updating at a rate, for example, of no greater than 2 kHz in contrast to a 40 MHz clock representative of the gyro processor and the approximate time budget of 5 microseconds per $\tau$ for a 1 km gyro.

The gyro processor, discussed in detail below, is arranged to eliminate so-called test and branch software instructions that reflect the presence of "select" routines as illustrated, for example, in the loop controller of U.S. Pat. No. 5,337,143.

The acronyms referred to in the following discussion, each comprising a thirty-two bit digital word, are identified hereinafter as follows:

| Digital Word | Function of Parameter |
|---|---|
| 1. PERT | Perturbation input for observing analog gain of loop; |
| 2. DCOMP | Value to compensate effect of perturbation input to loop; |
| 3. ADOFF | D.C. offset of output received from gyro; |
| 4. OINT | A value derived by gyro processor to calc. ADOFF error; |
| 5. PMSF | ("Phase Modulator Scale Factor") Value the digital-to-analog converter converts to a phase of $2\pi$ for driving the phase modulator; |
| 6. SINT | A value derived by gyro processor for calculating PMSF error; |
| 7. AGC | Value derived by gyro processor to calculate analog gain error; |
| 8. Δθ | Value of angle through which gyro has rotated during τ; |
| 9. CLEAR | Value(s) that determine whether the primary integrator is reset to zero. |
| 10. PINT | Value of primary integrator which corresponds to current angular rate. |

The various relationships employed for updating the parameters by means of the auxiliary processor rely upon well-understood physical principles that are known to and understood by those skilled in the art. The interactions between the parameters and the logic for providing parameters to the gyro processor 32 are disclosed and described, for a microprocessor-controlled system, in pending patent application Ser. No. 08/520,217 and are hereby incorporated by reference.

Figure 2:
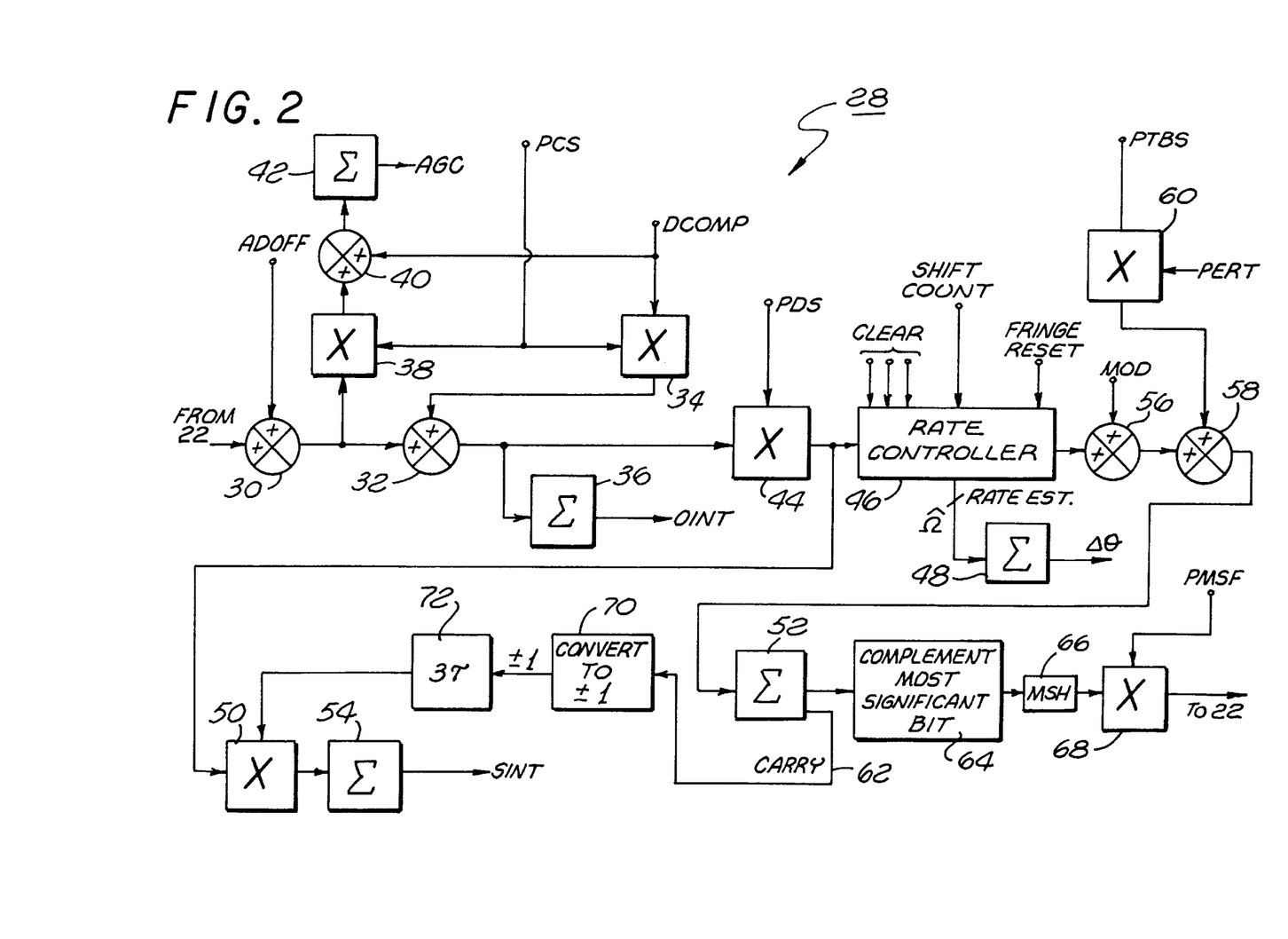
FIG. 2 is a block diagram illustrating the functions of the loop controller of the fiber optic gyro incorporating the invention.

FIG. 2 is a block diagram illustrating the functions of the loop controller 10 of the fiber optic gyro of FIG. 1. The gyro processor 28 receives, as input, a digital word representing the intensity of the output of the gyro 12 from the analog-to-digital converter 22 during each loop transit time τ. This value is corrected for d.c. offset or error (ADOFF) resulting from processing by the analog-to-digital converter 22 at 30. The auxiliary processor periodically updates the d.c. offset value in response to variations in the value of a variable ("OINT") that is computed within the gyro processor 28, discussed below.

The output of the gyro 12, corrected for d.c. offset, is then applied to 32 where it is corrected for a nominal dither or perturbation value ±d that was injected during a prior transit time. The perturbation correction value applied at 32 is generated by multiplying the constant perturbation value DCOMP by +1 or −1 at 34. The ±1 value represents the perturbation correction sign PCS derived from the perturbation or dither applied three transit times (t−3τ) prior (PERT). The sign is chosen from a predetermined, pseudo-random or random sequence which determines the polarity of the perturbation (PTBS) applied to the gyro for the purpose of measuring loop gain. The perturbation correction sign PCS and perturbation correction value DCOMP are multiplied at 34 prior to summing at 32.

The output of the gyro 12, having been corrected for d.c. offset and for perturbation, is applied to 36 where a sum is taken to generate OINT, the offset error integrator, an average of the perturbation corrected values. The offset compensated gyro output derived at 30 is multiplied at 38 by the perturbation correction sign PCS to demodulate the perturbation signal. The perturbation compensation value DCOMP is added to the result at 40 to form a net error term. The net error is integrated at 42 to derive the gain error signal AGC. In the event that the perturbation compensation DCOMP has "nulled" the perturbation component of the input signal, the output of the integration 42 will be constant. Otherwise, the presence of an additional or residual amount of uncompensated perturbation will indicate the presence of a loop gain error.

The dither and offset-compensated gyro signal is multiplied at 44 by the demodulation sign PDS which corresponds to a series of ±1's describing the prior modulation (MOD). The output of 44 represents the rate error. This value is summed and applied to a rate controller 46 whose architecture will be derived, disclosed in detail and analyzed below. The rate controller 46 functions to maintain the gyro at null in the presence of an angular rate input Ω by generating a gyro rate estimate (from the gyro rate error) as well as applying a digital gain and a rate feedback to phase integrator 52 to be discussed below.

The estimate of gyro rate is integrated at 48 to produce the change in angular position value Δθ which is employed to generate various navigation parameters related to attitude change. A set of CLEAR signals (having a value of "0" or "−1") associated with each of the cascaded integrators internal to the rate controller 46, will be seen to determine the order of the residual gyro error in a system configured in accordance with the invention.

The output of 44 is also multiplied at 50 by a CARRY signal generated during an integration of a prior τ by a phase integrator 52. The multiplication at 50 generates the scale factor error demodulation and this is integrated at 54 to provide an estimate of phase modulator scale factor error (a signal SINT).

The thirty-two bit word representing the rate value yielded by the cascaded integrators is shifted left within the rate controller 46, affecting or applying digital gain to the rate estimate value. (Each leftward shift results in an effective multiplication by 2. Because of finite word length, the output of the shifter is limited in range. An inherent modulo $2^{32}$ operation results from the choice of a thirty-two bit operation. By setting a $2^{32}$ output of the shift left to represent exactly 2 π, a modulo 2 π phase control is built into the algorithm implemented in the gyro processor 28. This limits the range of the voltage applied to the modulator to a 2 π equivalent phase shift range. As a result, 2 π "resets" known to those familiar in the art of closed loop fiber optic gyros occur naturally and automatically with no threshold testing.)

The rate error signal ε, applied to the rate controller 46 wherein it is integrated and shifted left as above-described, provides a "rebalance" signal for maintaining the gyro at null in the presence of angular rate. This signal tries to cancel out the Sagnac phase shift induced by angular rate, leaving an unavoidable residual signal ε as described above. The output of the rate controller 46 is summed at 56 with the modulation value MOD (conventionally corresponding to ±π/2 or another value corresponding to overmodulation described in U.S. patent application Ser. No. 08/613,558 of John G. Mark et al., entitled "Method and Apparatus For Overcoming Cross-Coupling in a Fiber Optic Gyroscope Employing Overmodulation") output each τ. In accordance with the $2^{32}$ representation of 2 π as discussed, π/2 corresponds to a value of $2^{30}$. The sign of the modulation (incorporated into MOD) can change every τ. As described above, the values of MOD provided at 56 may be of a deterministic, orthogonal, random or any other character.

A perturbation or dither value is then added to the rate-plus-modulation at 58. The perturbation signal is generated by multiplying the perturbation value PERT by the perturbation sign PTBS at 60. The output of 58, representing rate-plus-modulation-plus-perturbation, completes the feedback and modulation. The rate-plus-modulation-plus-perturbation value is integrated at 52 to close the loop. The summation at 52 generates a digital step phase integration plus a CARRY signal (generated whenever the addition operation would have resulted in toggling of the 33rd bit) that is output at 62. CARRY, in combination with the rate error value determined at 44, is employed to determine the scale factor error SINT.

The loop controller 10 is arranged to operate with a digital-to-analog converter 24 having a "non-adjustable" reference. That is, the digital-to-analog converter 24 need not include an adjustment for scale factor variability. Such variability, often dependent upon temperature, affects the relationship between the analog voltage applied to the phase modulator 16 and the analog voltage applied to the phase modulator 16 and the resultant phase shift between the light waves that counterpropagate within the gyro 12. Compensation for this variability is accomplished by first complementing the most significant bit of the ramp at 64 to convert the value of the ramp from offset binary to two's-complement form, assuring that the ramp is symmetric about zero (i.e. no d.c. component).

The most significant sixteen bits of the 32-bit word describing the ramp are then extracted at 66 and the 16-bit representation is multiplied at 68 by the phase modulator scale factor estimate PMSF. The output of 68 is written to the digital-to-analog converter 24 which is arranged in a two's-complement format.

Referring to the loop for determining scale factor error, the CARRY output of the ramp integration 52 is transformed to a ±1 value at 70. (The values are generated within the gyro processor 28, −1 indicating a CARRY bit from the primary integrator 52 and +1 indicating the absence thereof.)

The output of 70 is delayed by 3 τ at 72 and then multiplied at 50 by the rate error value from 44. The output of 50 is integrated at 54 to generate the secondary scale factor error integrator, SINT, that is employed to update the phase modulator scale factor PMSF.

As mentioned earlier, closed loop gyro systems such as that described above are subject to problems in maintaining a stable operating point in the presence of higher order motion (e.g. vibration, acceleration, angular jerk and higher order components.) This is due to the existence of an unavoidable residual signal due to the time lag or delay between the feedback and Sagnac phases.

Figures 3, 4:
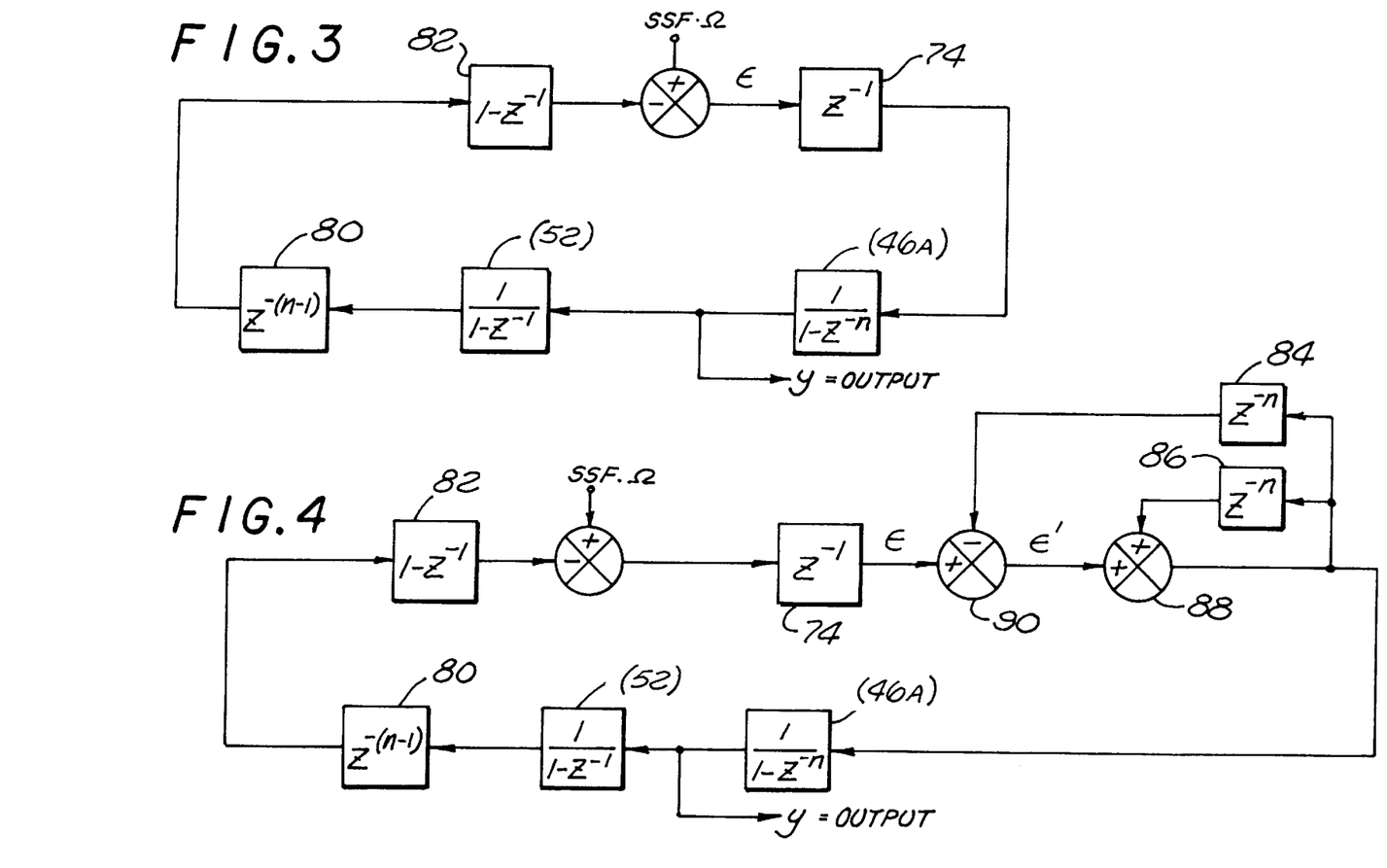
FIG. 3 is a linearized z-transform model of a closed loop gyro.
FIGS. 4 through 6 are a series of z-transform diagrams for illustrating manipulations employed in deriving the rate controller of the invention and thereby qualitatively verifying such configuration.

FIG. 3 is a linearized z-transform model of a closed loop gyro. The normal operation of a closed-loop gyro accumulates time delays each loop transit time τ that result in the presence of a residual error ε discussed above.

Figure 5:
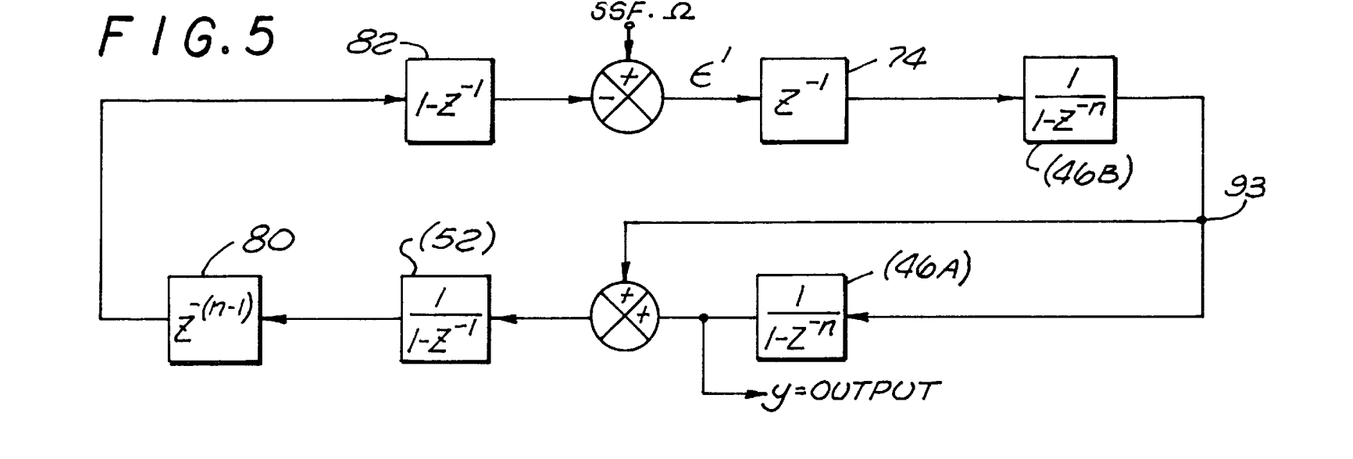
Figure 6:
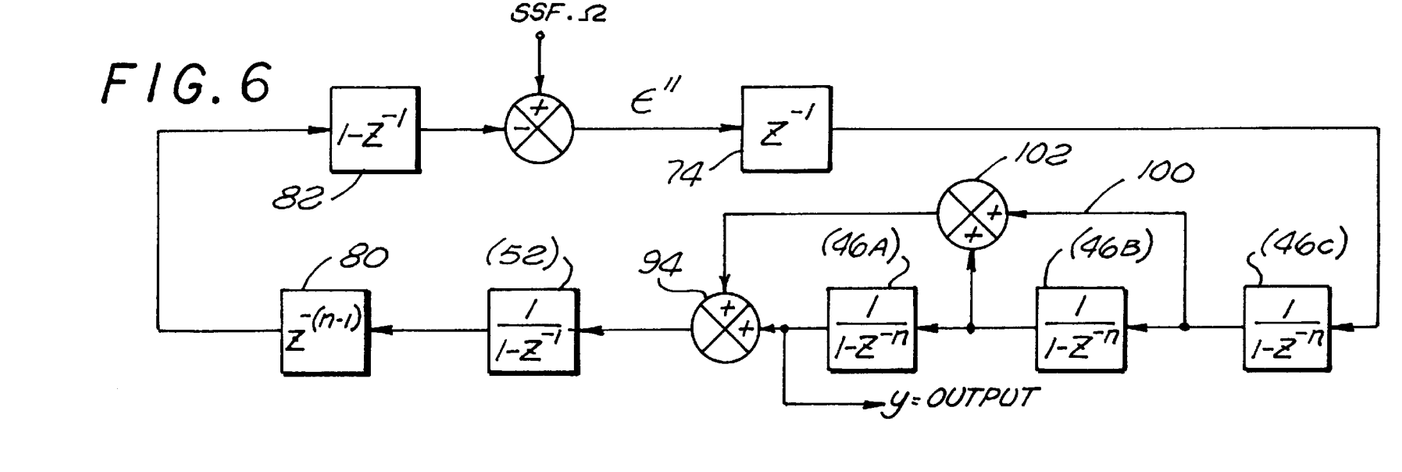

As a notational convention, in FIG. 3 and in FIGS. 4 through 6 that follow, when a z-transform characterizes the operation of an element previously defined in either FIG. 1 or FIG. 2, such transform is indicated in both the figure and in the written text by that (already-introduced) numeral in parentheses. Referring now to FIG. 3, a $Z^{-1}$ observation delay 74 defines the inherent 1 τ delay consumed by light travelling through the gyro coil. This delay is input to the $1/(1-Z^{-n})$ function of a single feedback integrator (46A) of a rate controller (46) generally in accordance with the prior art. Such a single feedback integrator arrangement is taught, for example, in pending patent application Ser. No. 08/520, 217, referenced above. A $1/(1-Z^{-1})$ operation characterizes the phase integrator (52). The output of this operation is processed through a $Z^{-(n-1)}$ delay 80 attributable to the various computations required every τ such as modulation, demodulation and analog-to-digital conversion. A $(1-Z^{-1})$ function (16) characterizes the operation of the phase modulator.

The loop illustrated in FIG. 3 is of the so-called "deadbeat" type without the higher order compensation. It will be seen below that first order residual error results from the single integrator (46A) configuration of the rate controller. As such, the ratio between the residual signal ε and the Sagnac scale factor Ω may be derived as follows (SSF represents Sagnac Scale Factor):

$$y/\Omega = SSF(z^{-1}/(1-z) \div (1+z^{-n}/(1-z^{-n})) = SSF \cdot z^{-1} \quad (1)$$

$$\epsilon/\Omega = (1-z^{-n})y/\Omega = SSF \cdot z^{-1}(1-z^{-n}) \quad (2)$$

The residual signal ε bears a first order relationship to the Sagnac rate Ω in equation 2 confirming the deadbeat loop characteristic.

In the present invention, the gyro loop is reconfigured so that the unavoidable residual signal bears a higher order relationship to the Sagnac output y. The theory and derivation of the design of a gyro loop in accordance with the invention follows from the discussion of various manipulations described in FIGS. 4 through 6 below.

In FIG. 4, the closed loop gyro is initially reconfigured by the insertion of a negative feedback path that includes an artificial delay 84. A second loop having positive feedback, and an identical artificial delay 86, is nestled within the first loop. As the nestled loop does no more than add a delayed value at a summing node 88 that was previously subtracted at a difference node 90, the addition of the nestled loop arrangement in FIG. 4 produces no net effect, leaving the same error or residual signal ε at both the input and the output to the nestled loops. (Note that the fictitious net residual signal subsequent to "de-incrementing" at the difference node 90 and prior to "re-incrementing" at the "additive node" 88 is denoted ε'.)

It may be noted that the nestled loop that includes the delay 86 and the summing node 88 has the z-transform $1/(1-z^{-n})$ of an integrator and the introduction thereof will become apparent in the subsequent derivation step.

Referring back to FIG. 4, the following relationships define the operation of the reconfigured gyro loop of FIG. 4 (SSF=Sagnac Scale Factor):

$$y/\Omega = SSF \cdot z^{-1} \quad (3)$$

$$\epsilon/\Omega = (1-z^{-n})y/\Omega = SSF \cdot z^{-1}(1-z^{-n}) \quad (4)$$

$$\epsilon'/\Omega = (1-z^{-n})\epsilon/\Omega = SSF \cdot z^{-1}(1-z^{-n})^2 \quad (5)$$

The residual value ε', produced internal to the nestled loops, now possesses a second order relationship to the Sagnac rate Ω. An equivalent z-transform diagram is illustrated in FIG. 5. This diagram reflects the conversion of the negative feedback path of the nestled loops into a feedback path to the phase modulator, making $\epsilon'$, rather than $\epsilon$, the relevant error signal. FIG. 5 represents a rearrangement of FIG. 4 having no net effect upon the operation of the closed loop gyro system and will be seen to lead to the reconfiguration of the rate controller for realizing a second order relationship between residual error and gyro rate.

As mentioned earlier, the positive feedback loop comprising the artificial delay 86 and the summing node 88 of the prior figure may be represented by the z-transform $1/(1-z^{-n})$, a term describing an integrator. Accordingly, the positive (or interior) feedback loop is replaced in this figure by a second feedback integrator (46B).

The negative feedback loop of FIG. 4 comprising the difference node 90 and the artificial delay 84 is described by a time delay $z^{-n}$. This is identical to the net or resultant of 74, (52), 80 and 82. Therefore, the negative feedback path introduced in FIG. 4 may be eliminated by transferring the output 93 of the (former) positive feedback path to the beginning of (52), 80, 82 and 74 as shown in FIG. 5, without a net effect upon the system. The loop is reconfigured in FIG. 5 by adding a summing node 94 whereby the output of the integrator (46B) is applied as an additional feed forward signal to the gyro control as shown. When this reconfiguration is performed, the new residual signal $\epsilon'$ replaces the first order deadbeat error signal $\epsilon$ at the observation delay 74. However, unlike the error signal $\epsilon$ of a conventional closed loop gyro, the new error signal $\epsilon'$ bears a second order relationship to the gyro rate $\Omega$.

Referring back to the z-transform diagram of the gyro of FIG. 5, one can see that this closed loop system differs from the deadbeat loop of FIG. 3 by the addition of the second integrator (46B). By feeding forward the output of the second integrator (46B) to the summing node 94, the second integrator (46B) is arranged into a cascaded relationship with respect to the first integrator (46A).

The preceding process may be repeated numerous times to derive closed loop configurations characterized by residual error terms that bear successively higher-order relationships to gyro rate $\Omega$. FIG. 6 discloses the linearized z-transform of a loop characterized by a third order residual error $\epsilon''$. The diagram of FIG. 6 was derived by extension of the operations of the previous figure. Unlike the second order configuration, the third order arrangement is begun from the second-order loop of FIG. 5. A pair of nestled feedback loops, one having positive and the other negative feedback, are inserted after the observation delay 74. Thereafter, the positive feedback inner loop is replaced by a third integrator (46C). The positive feedback loop is then replaced by a new path 100, taking advantage of the fact that the product of 74, (52), 80 and 82 is equal to the equivalent delay $z^{-n}$. A new third order error signal $\epsilon''$ is produced at the output of the observation delay 74. Confirming the third order effect, the following set of equations describes the arrangement of FIG. 6:

$$y/\Omega = SSF \cdot z^{-1} \quad (6)$$

$$\epsilon''/\Omega = SSF \cdot z^{-1}(1-z^{-n})^3 \quad (7)$$

Referring to the process and resultant loop configuration, it may be generalized that successively higher-order residual error terms $\epsilon^m$ are obtained by (1) adding an (m+1)th loop integrator to the closed loop gyro, and (2) successively positively feeding forward the outputs of m loop integrators (i.e. feeding the outputs of the first (m−1) loop integrators to m−1 summing nodes. The result of this iterative process may be summarized as follows: to obtain an $m^{th}$ order relationship between residual error $\epsilon^m$ and Sagnac rate $\Omega$, (m−1) loop integrators are added in cascaded relationship, forming a rate controller (46) comprising cascaded integrators (46A), (46B), (46C), . . . etc.

Figure 7:
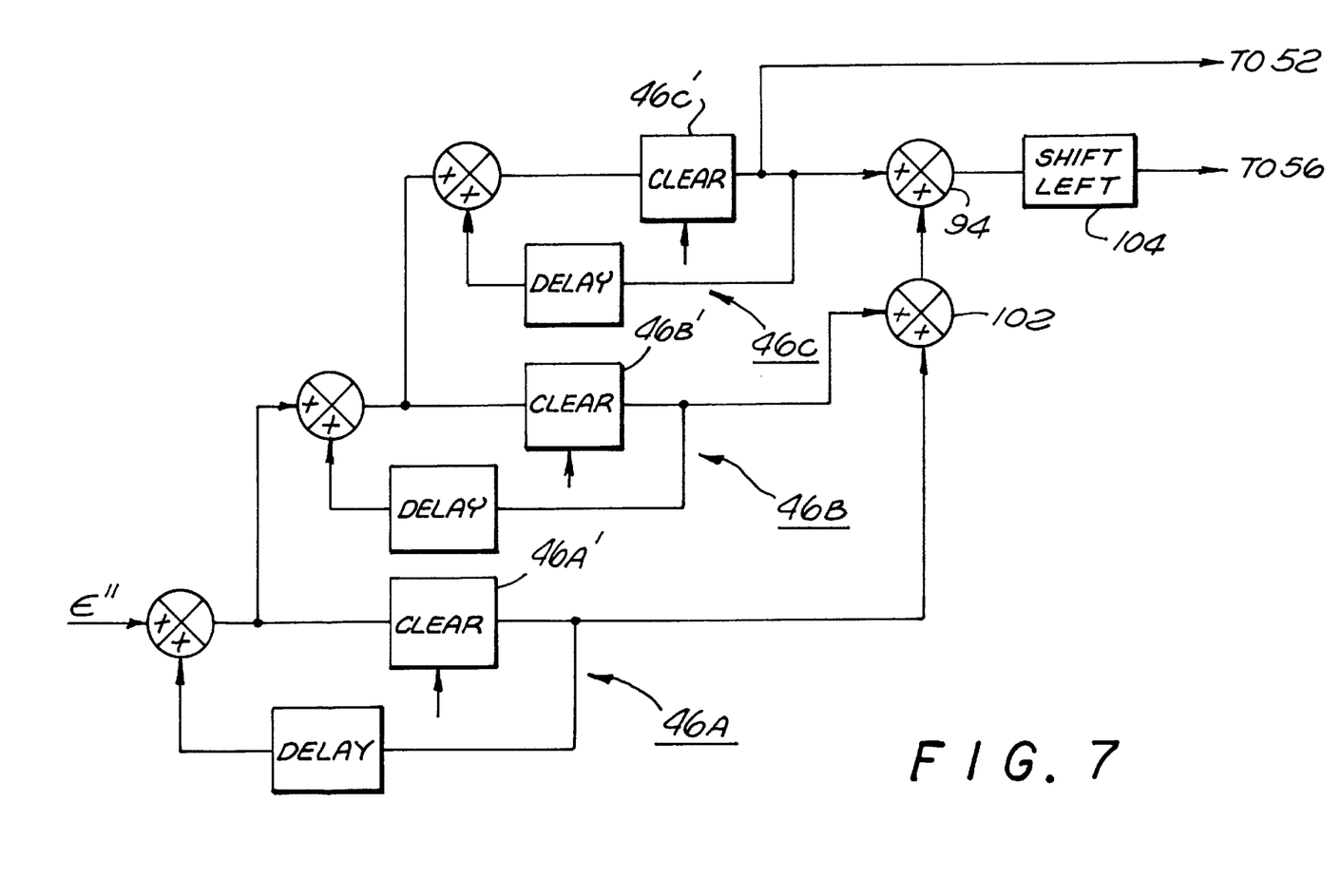
FIG. 7 is a schematic diagram illustrating the arrangement of a rate controller as derived in accordance with the manipulations of FIGS. 4 through 6.

FIG. 7 is a schematic diagram illustrating the arrangement of a rate controller 46 derived in accordance with the foregoing. By incorporating such a controller 46 into the closed-loop gyro of FIGS. 1 and 2, one can obtain substantial error reductions through the higher-order effects derived above. As shown, the rate controller comprises feedback integrators 46A, 46B and 46C interconnected to one another in a cascaded relationship with outputs of the integrator 46A and 46B summed at the node 102 and those of all three integrators summed at the node 94. Digital gain is applied to the output of the cascaded amplifiers at a shift left 104 to provide a rebalance signal for maintaining the gyro at null. Such rebalance signal is then applied to the modulation 56. The output of feedback integrator 46C is output as the gyro rate estimate and applied to the $\Delta\theta$ integrator 52.

The integrator 46A includes an associated CLEAR 46A' for selectively resetting and holding the integrator 46C to a value of zero. This removes the integrator from the operation of the rate controller 46. As mentioned earlier, this is accomplished by the inputting of a predetermined signal. When such a CLEAR is applied and the cascaded integrator 46A effectively removed from the rate controller 46, the closed-loop gyro retains the operational configuration of FIG. 5 above. Such configuration yields a second order relationship between residual error and input rate. Otherwise, the configuration of FIG. 6 is obtained and a third order relationship exists between residual error and gyro rate. Similarly, a CLEAR operation 46B' can be combined with CLEAR 46A' to remove integrators 46A and 46B from the loop operation. This reduces the controller to the standard form of FIG. 3. A CLEAR operation 46C' is also incorporated to permit resetting the loop to zero for initialization purposes (i.e. at startup) by clearing the value of integrator 46C.

Figure 8:
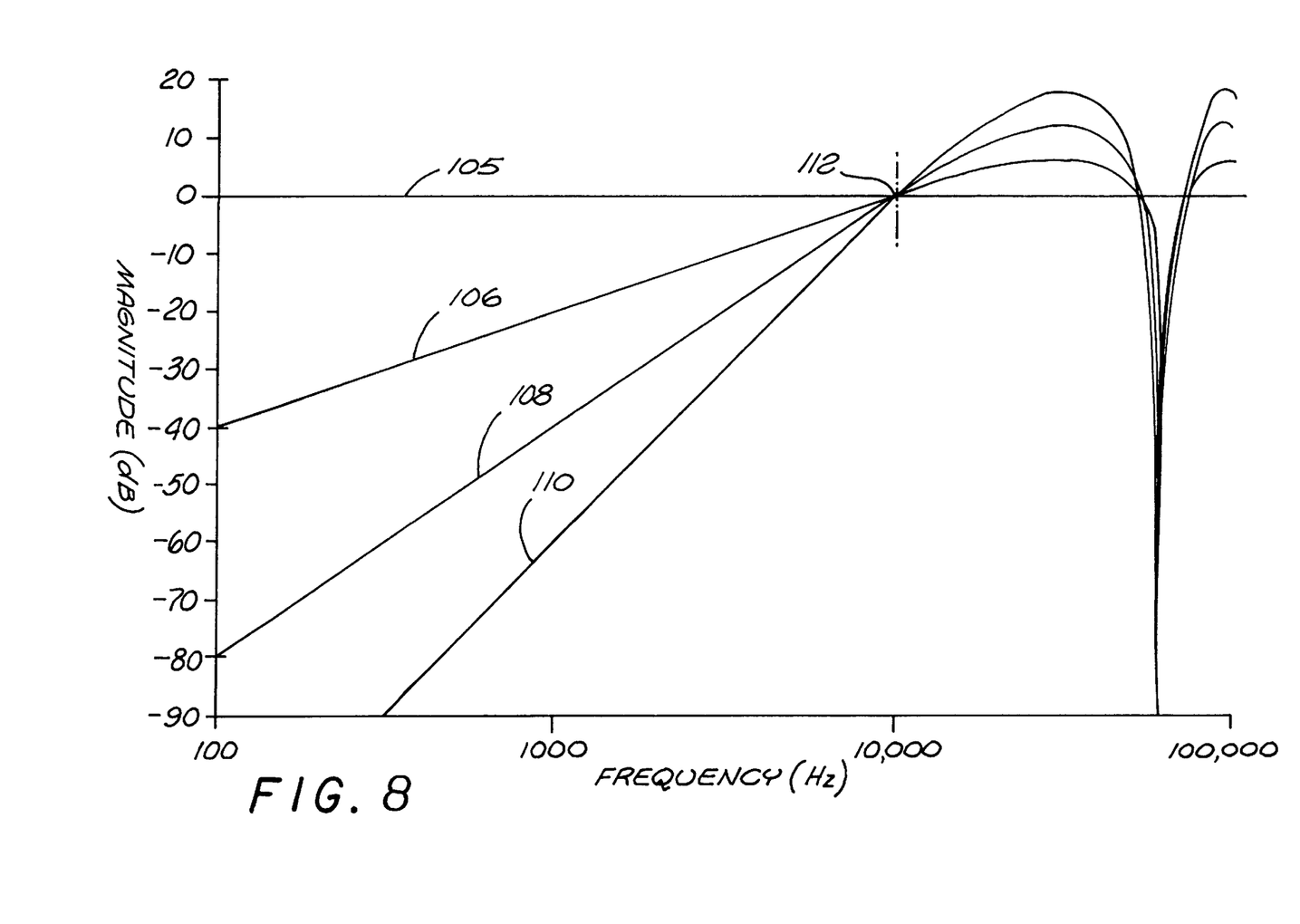
FIG. 8 is a graph of the frequency response of a gyro loop configured in accordance with the prior art and with the present invention (second and third order configurations) and thereby quantitatively verifying the present invention.

FIG. 8 is a graph of the frequency response of a gyro loop configured in accordance with the prior art 106 and with the present invention (second order 108 and third order 110 configurations). The abscissa of the graph plots the frequency of the sensed gyro signal in Hz while the ordinate plots corresponding values of the magnitude ratio of residual error to sensed gyro signal in dB. Line 105 plots the magnitude transfer function of measured angular rate to true angular rate (i.e. $|\hat{\Omega}/\Omega|$) on the same scale. Line 105 applies to the first, second, and third order loops. It is seen that the magnitude of the output signal exactly tracks the input angular rate across the frequency range. This is indicated by the flat 0 dB response.

The graph of FIG. 8 is based upon the assumption of a 1 km gyro. It should be kept in mind that, under normal operating conditions, such a device may be expected to be subjected to vibration in the range of 2000 Hz or less. Above this range, the plot assumes only theoretical interest. Lines 106, 108 and 110 plot the magnitude ratios of residual error to input gyro signal for a (prior art) closed-loop gyro that exhibits first order residual error response, and gyros in accordance with the invention that exhibit second and third order error terms, respectively (i.e. $|\epsilon/\Omega|$, $|\epsilon'/\Omega|$, $|\epsilon''/\Omega|$). As may be seen, substantial reductions in residual error content are observed in the relevant freqeunce range in systems configured in accordance with the invention. For example, at 1,000 Hz, a second order system in accordance with the invention exhibits an approximate improvement of approximately 20 dB while a third order system exhibits an approximate improvement of 40 dB over a prior art closed-loop gyro having a first order residual error characteristic.

The relative performances of gyros exhibiting first and higher order residual error characteristics are seen to undergo significant changes at frequencies beyond the cutoff frequency that coincides with the point of intersection 112 of the curves 106, 108 and 110. For a 1 km gyro with a system delay of three (3) gyro loop transit times, it can be shown that such cutoff frequency is approximately 10 kHz which, as mentioned above, is well above the range of vibration frequencies normally encountered. For this reason, degradation at very high frequencies in no way contradicts the substantial advantages provided by the present invention.

While this invention has been illustrated and described with reference to its presently-preferred embodiment, it is not limited thereto. Rather, this invention is limited only insofar as it is defined by the following set of patent claims and includes within its scope all equivalents thereof.

What is claimed is:

1. In a closed-loop system of the type that includes a fiber optic gyroscope, a phase modulator, a photodetector and a loop controller having a phase integrator and a feedback integrator, said system being subject to a residual error, the improvement comprising, in combination:
   a) said feedback integrator comprising a plurality of integrators; and
   b) said plurality of integrators being interconnected so that said residual error is a higher order function of frequency.

2. A closed-loop system as recited in claim 1 wherein said plurality of integrators are interconnected in cascaded relationship.

3. A closed-loop system as recited in claim 2 further including:
   a) means for applying a digital gain; and
   b) said means is arrayed to receive the sum of said cascaded integrators so that said means for applying a digital gain generates a rebalance signal.

4. A closed-loop system as recited in claim 3 wherein one of said cascaded amplifiers provides a gyro rate estimate signal.

5. A closed-loop system as recited in claim 1 further including:
   a) said plurality comprises two integrators; and
   b) said integrators are arrayed in cascaded relationship so that said residual error is a second order function of frequency.

6. A closed-loop system as recited in claim 5 wherein one of said cascaded integrators provides a gyro rate estimate signal.

7. A closed-loop system as recited in claim 1 further including:
   a) said plurality comprises three integrators; and
   b) said integrators are arrayed so that said residual error is a third order function of frequency.

8. A method for transforming a closed-loop system subject to residual error, said system being of the type that includes a fiber optic gyroscope, a phase modulator, a photodetector and a loop controller having a phase integrator and a feedback integrator, said method comprising the step of configuring said feedback integrator so that said residual error is a higher order function of frequency.

9. A method as recited in claim 8 wherein the step of configuring said feedback integrator further includes the steps of:
   a) providing a plurality of integrators; and then
   b) interconnecting said plurality of integrators so that the output of said feedback integrator compensates for higher order residual error.

10. A method as recited in claim 9 wherein the step of interconnecting further includes the step of interconnecting said integrators in a cascaded relationship.

11. A method as recited in claim 9 further comprising the steps of:
    a) providing two integrators; and then
    b) interconnecting said integrators in a cascaded relationship so that the output of said feedback integrator compensates for first order residual error.

12. A method as recited in claim 9 further including the steps of:
    a) providing three integrators; and then
    b) interconnecting said integrators in a cascaded relationship so that the output of said feedback integrator compensates for second order residual error.

* * * * *